(12) United States Patent
Hamasaki (10) Patent No.: US 7,864,462 B2
(45) Date of Patent: Jan. 4, 2011

(54) INTERCHANGEABLE LENS INCORPORATING A LENS DRIVE MOTOR

(75) Inventor: Takuji Hamasaki, Saitama (JP)

(73) Assignee: Hoya Corporation, Tokyo (JP)

( * ) Notice: Subject to any disclaimer, the term of this patent is extended or adjusted under 35 U.S.C. 154(b) by 193 days.

(21) Appl. No.: 11/857,478

(22) Filed: Sep. 19, 2007

(65) Prior Publication Data

US 2008/0253004 A1    Oct. 16, 2008

(30) Foreign Application Priority Data

Sep. 20, 2006    (JP) .............................. 2006-255001

(51) Int. Cl.
    *G02B 7/02* (2006.01)
(52) U.S. Cl. .................................... 359/827
(58) Field of Classification Search ......... 359/694–706, 359/819–827
    See application file for complete search history.

(56) References Cited

U.S. PATENT DOCUMENTS

| | | | | |
|---|---|---|---|---|
| 4,712,871 A | * | 12/1987 | Tanii et al. .................. | 359/827 |
| 4,841,327 A | * | 6/1989 | Yamamoto et al. .......... | 396/257 |
| 4,857,951 A | * | 8/1989 | Nakajima et al. ............. | 396/90 |
| 4,896,179 A | * | 1/1990 | Watanabe et al. ........... | 396/131 |
| 2002/0114623 A1 | | 8/2002 | Uenaka | |
| 2006/0104624 A1 | * | 5/2006 | Nakata et al. ................ | 396/137 |
| 2006/0198632 A1 | * | 9/2006 | Kingetsu ..................... | 396/529 |
| 2006/0210265 A1 | * | 9/2006 | Adachi ....................... | 396/374 |

FOREIGN PATENT DOCUMENTS

JP    2503997    4/1996

* cited by examiner

*Primary Examiner*—Scott J Sugarman
*Assistant Examiner*—Vipin M Patel
(74) *Attorney, Agent, or Firm*—Greenblum & Bernstein P.L.C.

(57) ABSTRACT

An interchangeable lens includes a lens drive mechanism for driving a movable lens group provided in the interchangeable lens; a lens-motor for driving the movable lens group via the lens drive mechanism; and a power transmission mechanism for transmitting a driving force of a body-motor provided in a camera body to the lens drive mechanism with the interchangeable lens being mounted to the camera body.

10 Claims, 5 Drawing Sheets

Fig. 1

Front ← → Rear

INTERCHANGEABLE LENS INCORPORATING A LENS DRIVE MOTOR

BACKGROUND OF THE INVENTION

1. Field of the Invention

The present invention relates to an interchangeable lens detachably attached to a camera body which includes a motor (body-motor) for driving at least one movable lens group of the interchangeable lens and a power source for the body-motor.

2. Description of the Related Art

In interchangeable lenses for cameras, that are detachably attached to a camera body, it is ideal that one or more movable lens groups (e.g., focusing lens group) be driven by a motor (lens-motor) provided in the interchangeable lens, not by a motor (body-motor) provided in a camera body to which the interchangeable lens is mounted. This is because the lens-motor is adopted according to specifications of the photographic optical system provided in the interchangeable lens itself, whereas the body-motor is adopted irrespectively of specifications of the photographic optical system provided in the interchangeable lens. An interchangeable lens having a lens-motor provided therein is disclosed in, e.g., Japanese Patent Publication No. 2503997.

However, such an interchangeable lens having a lens-motor provided therein has the following problem.

Namely, in the case where the camera body to which the interchangeable lens is to be mounted is of a type incorporating a body-motor, the lens-motor cannot be actuated even when the interchangeable lens with the lens-motor is mounted to the camera body because the power source in the camera body cannot supply power to the lens-motor. On the other hand, the interchangeable lens having a lens-motor is provided with no power transmission device for transmitting power of the body-motor of the camera body to the interchangeable lens mounted thereto. Therefore, it is conventionally the case that the interchangeable lens having a lens-motor can be applied solely to camera bodies designed to be capable of supplying power to the lens-motor of the interchangeable lens, and therefore, cannot be used for other types of camera bodies which can use an AF function.

SUMMARY OF THE INVENTION

The present invention provides an interchangeable lens incorporating a lens drive motor, wherein one or more lens groups of the interchangeable lens can be driven by the lens drive motor not only when the interchangeable lens is mounted to the camera body with a power source capable of supplying power to the lens-motor but also when the interchangeable lens is mounted to the camera body capable of supplying power to the body-motor and incapable of supplying power to the lens-motor, and wherein no needless load is applied to either motor which is not in action.

According to an aspect of the present invention, an interchangeable lens is provided, detachably attached to a camera body having a body-motor, the interchangeable lens including a lens drive mechanism for driving a movable lens group in an optical axis direction; a lens-motor for driving the movable lens group via the lens drive mechanism; and a power transmission mechanism for transmitting a driving force of the body-motor of the camera body to the lens drive mechanism of the interchangeable lens.

It is desirable for the interchangeable lens to be selectively mountable to the camera body and another type of camera body, the camera body including a power source capable of supplying electric power to the body-motor and incapable of supplying electric power to the lens-motor, and the another type of camera body including a power source for the lens-motor, wherein the interchangeable lens further includes an electric power transfer member (P1) for receiving supply of electric power from the power source of the another type of camera body with the interchangeable lens being mounted to the another type of camera body.

According to this configuration, if the camera body to which the interchangeable lens is mounted is of a type including a power source capable of supplying electric power to the lens-motor, electric power provided by the power source of the camera body is transferred to the lens-motor via the electric power transfer member, so that the movable lens group can be driven by a driving force of the lens-motor. On the other hand, if the camera body to which the interchangeable lens is mounted is of a type including a power source incapable of supplying electric power to the lens-motor but capable of supplying electric power to the body-motor that is provided in the camera body, a driving force of the body-motor is transmitted to the lens drive mechanism via the power transmission mechanism. Therefore, in this case the movable lens group can be driven through the use of the driving force of the body-motor.

It is desirable for the power transmission mechanism to serve as a first one-way rotational transfer mechanism which transmits the driving force of the body-motor to the lens drive mechanism and prevents movements of the lens drive mechanism from being transmitted to the body-motor. The interchangeable lens further includes a second one-way rotational transfer mechanism which is positioned between the lens-motor and the lens drive mechanism, the second one-way rotational transfer mechanism transmitting a driving force of the lens-motor to the lens drive mechanism and preventing movements of the lens drive mechanism from being transmitted to the lens-motor.

According to the configuration, no needless load is applied to the lens-motor which is not in action because the motive power of the body-motor is prevented from being transmitted from the lens drive mechanism to the lens-motor not in action by the second one-way rotational transfer mechanism even if the lens drive mechanism is driven by the body-motor. Additionally, even if the lens drive mechanism is actuated upon, e.g., a manual focus ring provided on the interchangeable being manually rotated to carry out a manual focusing operation, the movement of the lens drive mechanism is prevented from being transmitted from the lens drive mechanism to the body-motor by the first one-way rotational transfer mechanism, and the movement of the lens drive mechanism is prevented from being transmitted from the lens drive mechanism to the lens-motor not in action by the second one-way rotational transfer mechanism. Therefore, in this case also, no needless load is applied to either the body-motor or the lens-motor not in action.

It is desirable for the lens-motor to include an ultrasonic motor.

It is desirable for the power transmission mechanism to include a rotatable coupler which is provided at a rear end of the interchangeable lens, the rotatable coupler being coupled to a rotary shaft of the body-motor upon the interchangeable lens being mounted to the camera body.

It is desirable for the electric power transfer member to include at least one conductive pin.

It is desirable for the movable lens group to serve as a focusing lens group.

In an embodiment, an interchangeable lens is provided, including a movable lens group; a lens drive mechanism; a lens-motor for driving the movable lens group via the lens drive mechanism; a first one-way rotational transfer mechanism, provided between the lens drive mechanism and a rotatable coupler positioned at a rear end of the interchangeable lens, for transmitting a driving force of a body-motor provided in a camera body to the lens drive mechanism and preventing movements of the lens drive mechanism from being transmitted to the body-motor with the interchangeable lens being mounted to the camera body, and a second one-way rotational transfer mechanism, provided between the lens drive mechanism and the lens-motor, for transmitting a driving force of the lens-motor to the lens drive mechanism and preventing movements of the lens drive mechanism from being transmitted to the lens-motor with the interchangeable lens being mounted to another type of camera body which includes a power source for the lens-motor. The rotatable coupler is coupled to a rotary shaft of the body-motor upon the interchangeable lens being mounted to the camera body. The camera body includes a power source capable of supplying electric power to the body-motor and incapable of supplying electric power to the lens-motor.

According to the present invention, in the case where the interchangeable lens having a lens-motor is mounted to the camera body having a body-motor, the movable lens group in the interchangeable lens can be driven by the body-motor since the power transmission device of the interchangeable lens can transmit power of the body-motor to the lens drive mechanism of the interchangeable lens.

The present disclosure relates to subject matter contained in Japanese Patent Application No. 2006-255001 (filed on Sep. 20, 2006) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
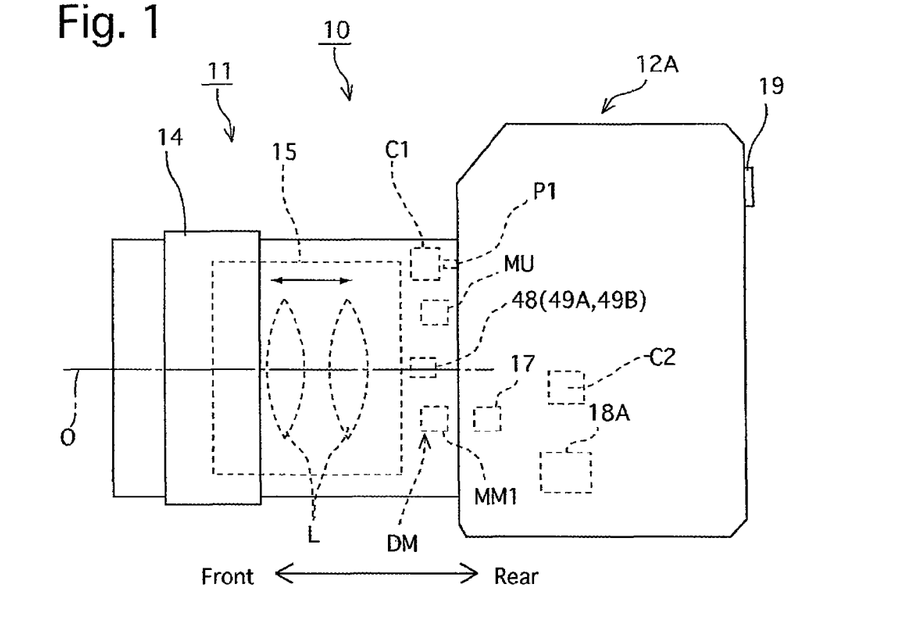
FIG. 1 is a schematic side elevational view of a camera system consisting of an old-type camera body, and an embodiment of an interchangeable lens of the present invention which is mounted to the old-type camera body.
Figure 2:
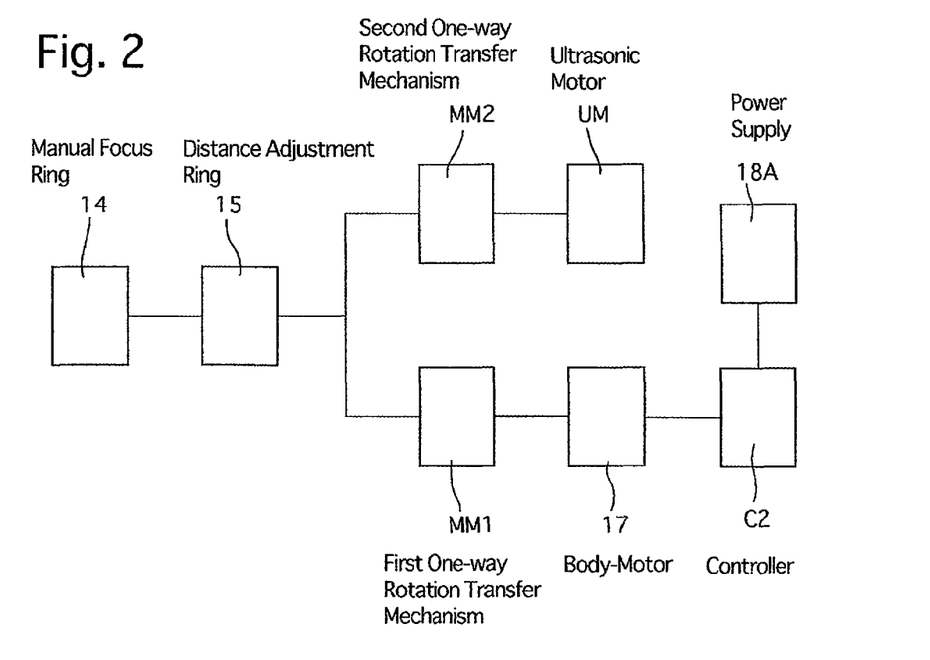
FIG. 2 is a block diagram of a lens drive system and a control system of the old-type camera system shown in FIG. 1 when the interchangeable lens is mounted thereto.
Figure 3:
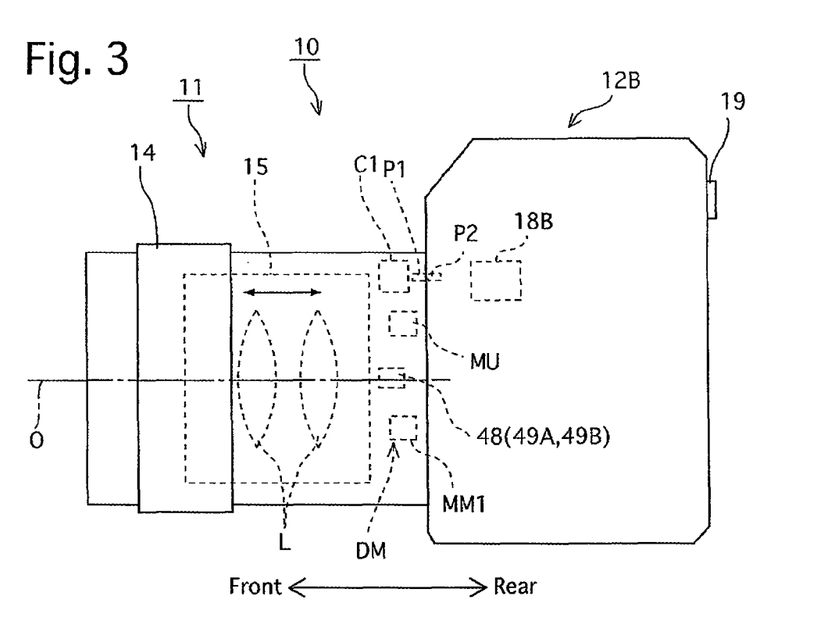
FIG. 3 is a schematic side elevational view of a camera system consisting of a new-type camera body, and an embodiment of an interchangeable lens according to the present invention which is mounted to the new-type camera body.
Figure 4:
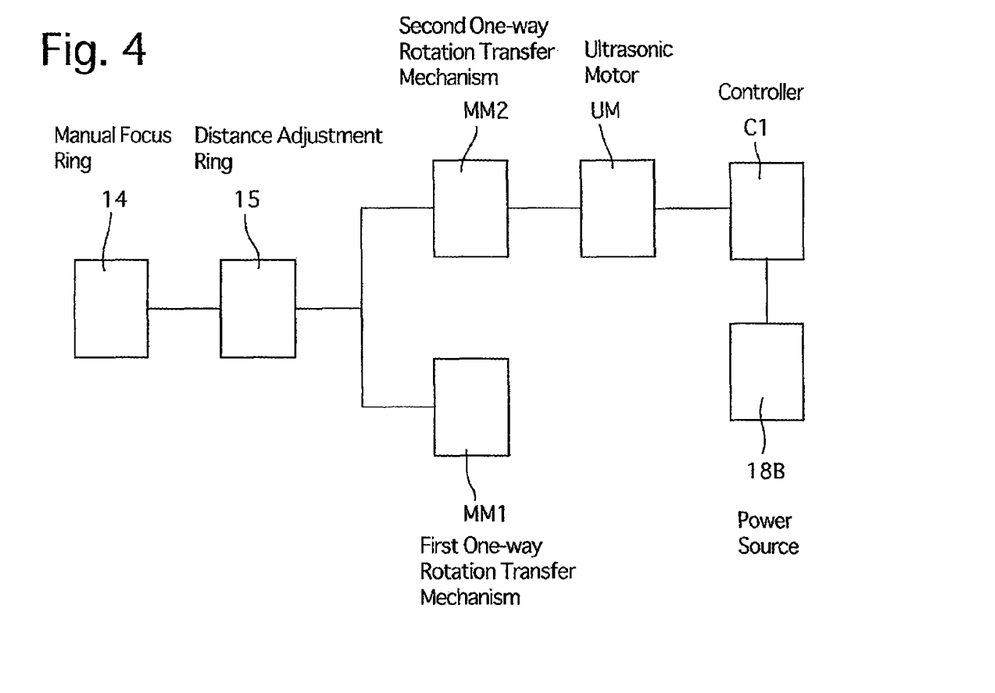
FIG. 4 is a block diagram of a lens drive system and a control system of the new-type camera system shown in FIG. 3 when the interchangeable lens is mounted thereto.
Figure 5:
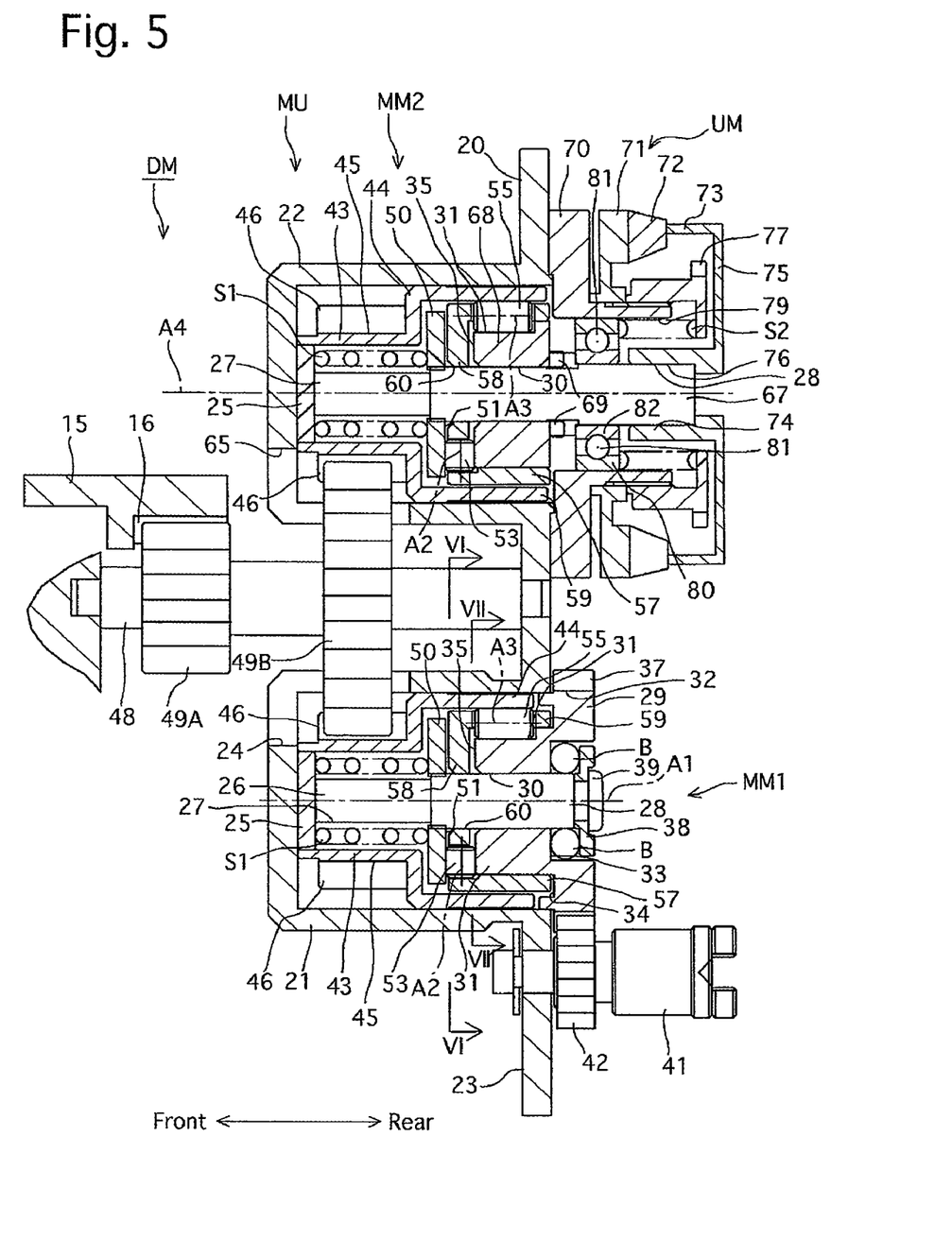
FIG. 5 is an enlarged longitudinal cross sectional view of a lens drive mechanism of the interchangeable lens shown in FIGS. 1 and 2.

Note that forward and rearward directions of a camera system 10/lens drive mechanism DM are determined with reference to the double-headed arrows shown in FIGS. 1, 3 and 5.

Firstly, the overall structure of the camera system 10 will be hereinafter discussed with reference to FIGS. 1 and 3.

An embodiment of an interchangeable lens 11 of the camera system 10 can be selectively mounted to an old-type camera body (second camera body) 12A and a new-type camera body (first camera body) 12B as shown in FIGS. 1 and 3, respectively. The old-type camera body 12A is a type of camera body which cannot supply power to an ultrasonic motor (lens-motor) UM provided in the interchangeable lens 11, and the new-type camera body 12B is a type of camera body which can supply power to the ultrasonic motor UM.

The overall structure of the camera system 10 shown in FIG. 1, that consists of the interchangeable lens 11 and the old-type camera body 12A, will be hereinafter discussed with reference to FIG. 1.

The camera system 10 shown in FIG. 1 is provided with the interchangeable lens 11 and the old-type camera body 12A, which can be detachably attached to each other.

The interchangeable lens 11 is provided therein with a focusing lens group L movable forward and rearward along an optical axis O of the interchangeable lens 11, and is provided, around an outer peripheral surface of a stationary barrel of the interchangeable lens 11, with a manual focus ring 14 which is manually rotatable about the optical axis O. The interchangeable lens 11 is further provided therein with a distance adjustment ring (element of a lens drive mechanism) 15 which rotates about the optical axis O in association with rotation of the manual focus ring 14 to move the focusing lens group L forward and rearward along the optical axis O. The interchangeable lens 11 is further provided therein with a lens drive mechanism DM for moving the focusing lens group L forward and rearward along the optical axis O by motive power, and a controller C1 for controlling the operation of the ultrasonic motor (lens-motor) UM. The interchangeable lens 11 is provided in a rear end surface thereof with metal conductive pins (electric power transfer members) P1 which project outward from this rear end surface and are electrically connected to the controller C1.

The old-type camera body 12A, which is incapable of supplying electric power to the ultrasonic motor UM, is provided with a body-motor 17 which is a commonly-used motor using coils, a power supply 18A capable of supplying electric power to the body-motor 17, and an AF switch 19. The old-type camera body 12A is further provided with a controller C2 which is electrically connected to the power supply 18A and the body-motor 17 to control the operation of the body-motor 17 through the use of electric power produced by the power supply 18A.

The overall structure of the new-type camera body 12B will be hereinafter discussed with reference to FIG. 3. Note that the description of the interchangeable lens 11 is omitted from the following descriptions because the interchangeable lens 11 shown in FIG. 3 is the same as that shown in FIG. 1.

The new-type camera body 12B is provided with the AF switch 19, similar to that of the old-type camera body 12A, but is not provided with the controller C2, the body-motor 17 nor the power source 18A of the old-type camera body 12A. However, the new-type camera body 12B is provided with a power source 18B and conductive pins P2 which come in contact with the conductive pins P1 of the interchangeable lens 11 upon the interchangeable lens 11 being mounted to the new-type camera body 12B. The conductive pins P2 are electrically connected to the power source 18B.

Figure 6:
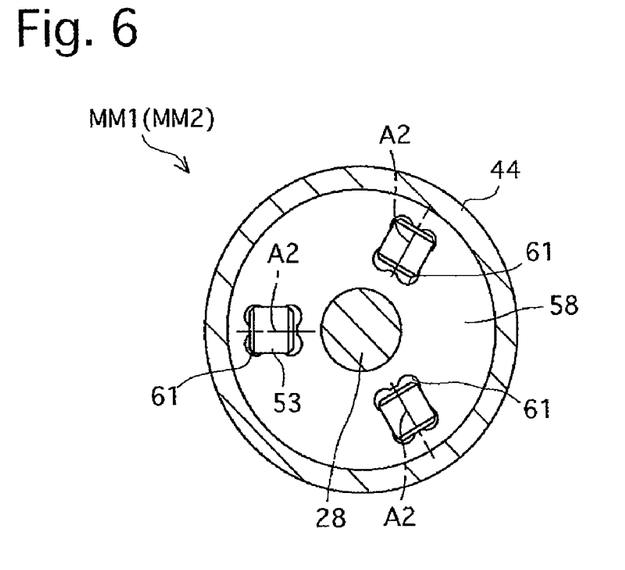
FIG. 6 is a cross sectional view taken along VI-VI line shown in FIG. 5.

The lens drive mechanism DM that is provided in the interchangeable lens 11 will be hereinafter discussed in detail with reference to FIGS. 5 through 7.

The lens drive mechanism DM is provided with a stationary housing 20 which is secured to a stationary member provided in the interchangeable lens 11 by set screws. The stationary housing 20 is provided with a pair of cylindrical accommodation portions: a lower cylindrical accommodation portion 21 and an upper cylindrical accommodation portion 22 that is positioned above the lower cylindrical accommodation portion 21. The lens drive mechanism DM is provided in the lower cylindrical accommodation portion 21 and the upper cylindrical accommodation portion 22 with a first one-way rotational transfer mechanism (power transmission mechanism) MM1 and a second one-way rotational transfer mechanism MM2, respectively.

First of all, the lower cylindrical accommodation portion 21 and the first one-way rotational transfer mechanism MM1 that is provided in the lower cylindrical accommodation portion 21 will be discussed hereinafter.

The rear end of the lower cylindrical accommodation portion 21 is formed as an open end, and an opening 24 is formed in the corner of the lower cylindrical accommodation portion 21 between the front wall and an upper portion of the circumferential wall of the lower cylindrical accommodation portion 21. A disc plate 25 is fixed to a rear surface of the front wall of the lower cylindrical accommodation portion 21 at the center thereof. The one-way rotational transfer mechanism MM1 is provided in the lower cylindrical accommodation portion 21 with a stationary shaft 26 which is positioned coaxially with the axis of the lower cylindrical accommodation portion 21. A front end surface of the stationary shaft 26 is fixed to a rear surface of the disc plate 25. The stationary shaft 26 is a cylindrical columnar member consisting of a front small-diameter portion 27 and a rear large-diameter portion 28 positioned behind the front small-diameter portion 27. The axis A1 of the stationary shaft 26 is parallel to the optical axis O of the interchangeable lens 11.

The first one-way rotational transfer mechanism MM1 is provided on the large-diameter portion 28 of the stationary shaft 26 with a hollow-cylindrical rotary input portion 29 having a central hole 30. The large-diameter portion 28 is fitted into the central hole 30 of the rotary input portion 29 so that the rotary input portion 29 is freely rotatable on the large-diameter portion 28 of the stationary shaft 26. The rotary input portion 29 is provided at front and rear portions thereof with a small-diameter portion 31 and a large-diameter portion 32, respectively, and is provided on a rear end surface of the large-diameter portion 32 with an annular recess 33. In addition, the rotary input portion 29 is provided on a front annular surface thereof with an engaging recess 34 having a ring shape as viewed from the front thereof. Additionally, the rotary input portion 29 is provided on a front end surface thereof with an axially-orthogonal surface 35 which lies in a plane orthogonal to the axis A1 of the stationary shaft 26.

Figure 7:
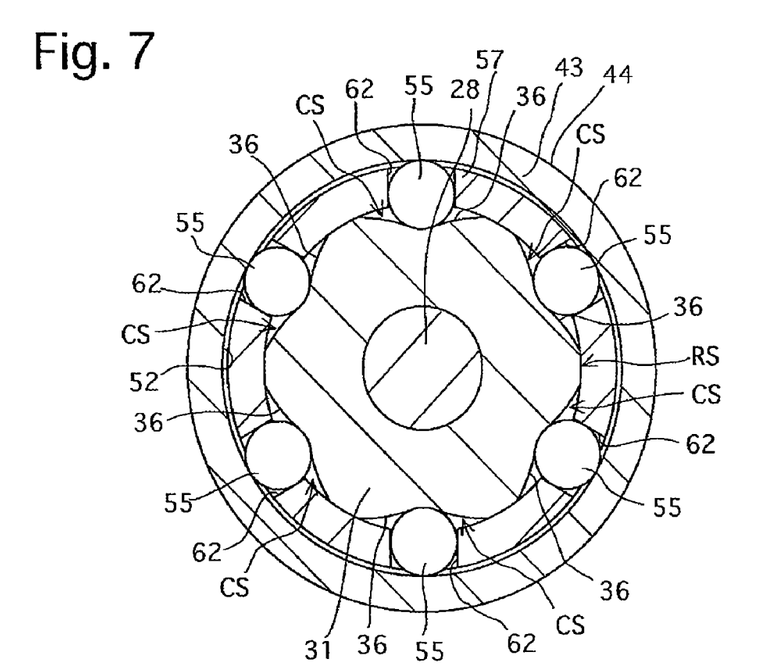
FIG. 7 is a cross sectional view taken along VII-VII line shown in FIG. 5.

The small-diameter portion 31 is provided, on an outer peripheral surface thereof at equi-angular intervals in a circumferential direction of the small-diameter portion 31, with six circumferentially-uneven-depth grooves 36 which have different depths (radial depths) at different circumferential positions as shown in FIG. 7 and extend parallel to the axis A1 of the stationary shaft 26. The large-diameter portion 32 is provided on an outer peripheral surface thereof with an input gear 37.

A front portion of the rotary input portion 29 in front of the input gear 37 is accommodated in the lower cylindrical accommodation portion 21. A plurality of steel balls B are positioned circumferentially in the annular recess 33 of the rotary input portion 29 so as to constitute a ball bearing. A ring-shaped retainer plate 38 having a diameter substantially the same as the diameter of the annular recess 33 is fixed to the rear end surface of the stationary shaft 26 by a set screw 39 to prevent the rotary input portion 29 from moving rearward beyond the position thereof shown in FIG. 5 by the engagement of each steel ball B with the ring-shaped retainer plate 38.

The first one-way rotational transfer mechanism MM1 is provided at the bottom of the lower cylindrical accommodation portion 21 with an AF joint (AF coupler) 41 which is coupled to an output shaft (rotary shaft; not shown) of the body-motor 17 of the camera body 12A when the interchangeable lens 11 is mounted to the old-type camera body 12A. The AF joint 41 is provided with a gear 42 which engages with the input gear 37 of the large-diameter portion 32. The gear 42 rotates about the axis of the AF joint 41 when a driving force of the body-motor 17 is transmitted to the AF joint 41.

The first one-way rotational transfer mechanism MM1 is provided inside the lower cylindrical accommodation portion 21 with a hollow-cylindrical rotary output shaft 43 whose front and rear ends are each formed as an open end. The hollow-cylindrical rotary output shaft 43 is rotatable about the stationary shaft 26. The hollow-cylindrical rotary output shaft 43 is formed so that a diameter thereof increases stepwise in a direction toward the rear of the hollow-cylindrical rotary output shaft 43 so as to have a two-stepped diameter. Specifically, the hollow-cylindrical rotary output shaft 43 is provided with a large-diameter portion 44 and a small-diameter portion 45, in that order from the rear end to the front end of the hollow-cylindrical rotary output shaft 43. A rear end portion of the large-diameter portion 44 is fitted in the annular space formed between an inner peripheral surface of the lower cylindrical accommodation portion 21 and an outer peripheral surface of the small-diameter portion 31 of the rotary input portion 29 so that the large-diameter portion 44 of the hollow-cylindrical rotary output shaft 43 is rotatable about the stationary shaft 26, while a front end portion of the small-diameter portion 45 of the hollow-cylindrical rotary output shaft 43 is fitted on an outer peripheral surface of the disc plate 25 so that the small-diameter portion 45 is rotatable on the disc plate 25. The small-diameter portion 45 is provided on its entire outer peripheral surface with an output gear 46.

As shown in FIG. 5, the rear end of a power transmission shaft (element of the lens drive mechanism) 48 that is parallel to the axis A1 of the of the stationary shaft 26 is rotatably supported by a central portion of the stationary housing 20 by which the lower cylindrical accommodation portion 21 and the upper cylindrical accommodation portion 22 are joined to each other, and the front end of the power transmission shaft 48 is rotatably supported by an internal stationary member of the interchangeable lens 11. The power transmission shaft 48 is provided in the vicinity of the front end thereof with a gear (element of the lens drive mechanism) 49A which is formed integral with the power transmission shaft 48. The gear 49A is engaged with an input gear 16 which is formed on an inner peripheral surface of the distance adjustment ring 15 at the rear end thereof. The power transmission shaft 48 is further provided at an axial center thereof with a gear (element of the lens drive mechanism) 49B which is formed integral with the power transmission shaft 48 and greater in diameter than the gear 49A. The gear 49B is engaged with the output gear 46 of the hollow-cylindrical rotary output shaft 43 through an opening 24 formed in the lower cylindrical accommodation portion 21.

An annular pressing member 50 is fitted on the front portion of the rear large-diameter portion 28 of the stationary shaft 26 to be positioned in front of the rotary input portion 29. The rear end surface of the annular pressing member 50 is formed as an axially-orthogonal surface 51 which lies in a plane orthogonal to the axis A1 of the stationary shaft 26. A compression coil spring S1 is installed in a compressed state between a front surface of the annular member pressing member 50 and a rear surface of the disc plate 25. The annular pressing member 50 is continuously biased rearward by the spring force of the compression coil spring S1.

Three differential rollers 53 each having a substantially cylindrical columnar shape are installed at equi-angular intervals in a circumferential direction between the axially-orthogonal surface 51 of the annular member pressing member 50 and the axially-orthogonal surface 35 of the small-diameter portion 31 so that an axis A2 of each differential roller 53 extends in a radial direction of the stationary shaft 26. The axially-orthogonal surface 51 and the axially-orthogonal surface 35 remain in contact with the periphery of each differential roller 53 (the three differential rollers 53 are continuously held between the axially-orthogonal surface 51 and the axially-orthogonal surface 35 via the spring force of the compression coil spring S1).

The inner peripheral surface of the large-diameter portion 44 of the hollow-cylindrical rotary output shaft 43 is formed as a cylindrical surface 52 centered on the axis A1 of the stationary shaft 26 (see FIG. 7), and an accommodation space CS having different radial widths at different circumferential positions is formed between the cylindrical surface 52 and each of the six circumferentially-uneven-depth grooves 36 as shown in FIG. 7. In other words, an annular space RS which is formed between the small-diameter portion 31 of the rotary input portion 29 and the cylindrical surface 52 of the large-diameter portion 44 is divided into six to form the six accommodation spaces CS.

An engageable roller 55 having a substantially cylindrical columnar shape is accommodated in each of the six accommodation spaces CS with an axis A3 of the engageable roller 55 extending parallel to the axis A1 of the stationary shaft 26. Each engageable roller 55 can move in the associated accommodation space CS in a circumferential direction about the axis A1 of the stationary shaft 26.

The first one-way rotational transfer mechanism MM1 is provided, in the annular space RS between the small-diameter portion 31 of the rotary input portion 29 and the cylindrical surface 52 of the large-diameter portion 44 and the space between the axially-orthogonal surface 35 of the small-diameter portion 31 and the axially-orthogonal surface 51 of the annular pressing member 50, with a cylindrical retainer 57 which is installed so that the cylindrical retainer 57 extends over these two spaces. The cylindrical retainer 57 is provided with a front wall 58, a peripheral wall portion 59 and a central hole 60. The front wall 58 is positioned in the space between the axially-orthogonal surface 35 of the small-diameter portion 31 and the axially-orthogonal surface 51 of the annular pressing member 50, the peripheral wall portion 59 is rotatably fitted into the engaging recess 34 of the rotary input portion 29, and is positioned in the annular space RS between the small-diameter portion 31 and the cylindrical surface 52 of the large-diameter portion 44, and the central hole 60 into which the rear large-diameter portion 28 is rotatably fitted is formed at a center of the front wall 58. As shown in FIGS. 5 and 6, the cylindrical retainer 57 is provided, on the front wall 58 thereof at equi-angular intervals in a circumferential direction, with three fitting holes 61, and the three differential rollers 53 are installed in the three fitting holes 61, respectively, so that each differential roller 53 is rotatable on the axis A2 thereof. On the other hand, as shown in FIGS. 5 and 7, the cylindrical portion 59 is provided at equi-angular intervals in a circumferential direction with six insertion holes 62. The six engageable rollers 55 are fitted in the six insertion holes 62, respectively, so that each engageable roller 55 can freely rotate on the axis A3 thereof and can freely move along the axis A3 thereof.

The above described elements provided on the lower cylindrical accommodation portion 21, except the AF joint 41 and the gear 42, are elements of the first one-way rotational transfer mechanism MM1.

The upper cylindrical accommodation portion 22, the second one-way rotational transfer mechanism MM2 that is provided in the upper cylindrical accommodation portion 22, and the ultrasonic motor UM that is integral with the second one-way rotational transfer mechanism MM2 will be discussed hereinafter.

The rear end of the upper cylindrical accommodation portion 22 is formed as an open end, and an opening 65 is formed in the corner of the upper cylindrical accommodation portion 22 between the front wall and a lower portion of the circumferential wall of the upper cylindrical accommodation portion 22.

As shown in FIG. 5, elements similar to those of the first one-way rotational transfer mechanism MM1 that are installed in the lower cylindrical accommodation portion 21 are installed in the upper cylindrical accommodation portion 22. These similar elements constitute the second one-way rotational transfer mechanism MM2 and are designated by the same reference numerals as those of the first one-way rotational transfer mechanism MM1. However, a rotary input shaft 67 and a rotary input portion 68 of the second one-way rotational transfer mechanism MM2 which correspond to the stationary shaft 26 and the rotary input portion 29 of the first one-way rotational transfer mechanism MM1 are different in shape from the stationary shaft 26 and the rotary input portion 29 of the first one-way rotational transfer mechanism MM1, respectively.

The rotary input shaft 67 of the second one-way rotational transfer mechanism MM2 (the axis A4 of which extends parallel to the axis A1 of the stationary shaft 26) is greater in length than the stationary shaft 26 of the first one-way rotational transfer mechanism MM1, and the rear end of the rotary input shaft 67 projects rearward from the rear end of the upper cylindrical accommodation portion 22; however, front and rear portions of the rotary input shaft 67 are formed as the front small-diameter portion 27 and the rear large-diameter portion 28, respectively, similar to the stationary shaft 26 of the first one-way rotational transfer mechanism MM1. The rear large-diameter portion 28 is provided, at the center of the outer peripheral surface thereof in the lengthwise direction of the rotary input shaft 67, with a pair of radial projections 69 which are arranged circumferentially at intervals of 180 degrees. However, the rotary input shaft 67 is rotatable relative to the disc plate 25 of the second one-way rotational transfer mechanism MM2.

The rotary input portion 68 of the second one-way rotational transfer mechanism MM2 is smaller in length than the rotary input portion 29 of the first one-way rotational transfer mechanism MM1 in the forward/rearward direction, and is entirely positioned in the upper cylindrical accommodation portion 22. The rear end surface of the rotary input portion 68 is in contact with the pair of radial projections 69 to be allowed to rotate while sliding on the pair of radial projections 69. However, similar to the rotary input portion 29 of the first one-way rotational transfer mechanism MM1, the rotary input portion 68 is provided with the central hole 30, the small-diameter portion 31, the axially-orthogonal surface 35 and the six circumferentially-uneven-depth grooves 36 (though not provided with the large-diameter portion 32, the annular recess 33, the engaging recess 34 and the input gear 37). Additionally, the rotary input portion 68 is non-rotatable relative to the rotary input shaft 67.

The gear 49B of the power transmission shaft 48 is engaged with not only the output gear 46 of the hollow-cylindrical rotary output shaft 43 of the first one-way rotational transfer mechanism MM1, but also the output gear 46 of the hollow-cylindrical rotary output shaft 43 of the second one-way rotational transfer mechanism MM2 through an opening 65 formed in the upper cylindrical accommodation portion 22.

An ultrasonic motor UM having the structure which will be discussed hereinafter is fixed to the second one-way rotational transfer mechanism MM2 to be integral therewith.

A cylindrical stationary member 70 which is formed in a cylindrical member centered on the axis A4 of the rotary input shaft 67 is fixed to a rear surface of the stationary housing 20 which is positioned radially outside of the upper cylindrical accommodation portion 22. The ultrasonic motor UM is provided with a ring-shaped ultrasonic generating member 71 with the axis thereof coincident with the axis A4 of the rotary input shaft 67. The ultrasonic generating member 71 is fitted on the outer peripheral surface of a rear portion of the cylindrical stationary member 70 to be fixed thereto so that the central hole of the ultrasonic generating member 71 is fixed to the outer peripheral surface of the cylindrical stationary member 70. The ultrasonic generating member 71 is provided, at the rear end thereof on the radially outer side of the ultrasonic generating member 71, with a vibration transmission portion 72 having a ring shape as viewed from the front thereof. The rear end surface of the vibration transmission portion 72 is formed in a ring-shaped surface orthogonal to the axis A4 of the rotary input shaft 67.

Additionally, the ultrasonic motor UM is provided at the rear end of the rotary input shaft 67 with a cylindrical rotary output shaft 75 having a bottomed end. The cylindrical rotary output shaft 75 is provided with an outer cylindrical portion 73 and an inner cylindrical portion 74 which are concentrically arranged. The inner cylindrical portion 74 is fitted on the rear end of the rotary input shaft 67 so that an annular recess 76 of the cylindrical rotary output shaft 75 (central hole of the inner cylindrical portion 74) is fixed to the rear end of the rotary input shaft 67. The front end surface of the outer cylindrical portion 73 is formed in a plane orthogonal to the axis A4, and is in contact with the rear end surface of the vibration transmission portion 72 to be slidable thereon to allow the ultrasonic generating member 71 and the outer cylindrical portion 73 to rotate relative to each other. The ultrasonic motor UM is provided, inside an internal space between the ultrasonic generating member 71 and the cylindrical rotary output shaft 75, with a cylindrical retainer 77 which is fitted on an outer peripheral surface of the stationary cylindrical member 70 to be fixed thereto.

An outer ring 80 is fitted into a central hole 79 of the stationary cylindrical member 70 to be slidable on an inner peripheral surface thereof (and to be prevented from rotating relative to this inner peripheral surface). An inner ring 82 is positioned radially inside of the outer ring 80 to be concentric with the outer ring 80 with a plurality of bearing balls 81 (only two of which are shown in FIG. 5) being held between the inner ring 82 and the outer ring 80. The inner ring 82 is rotatable relative to the outer ring 80 and prevented from moving in the axial direction relative to the outer ring 80. Accordingly, the outer ring 80, the plurality of bearing balls 81 and the inner ring 82 constitute a ball bearing.

A compression coil spring S2 is installed between the cylindrical retainer 77 and the outer ring 80. The outer ring 80, the plurality of bearing balls 81 and the inner ring 82 are biased forward by the spring force of the compression coil spring S2 so that the inner ring 82 is in elastic contact with the rear surfaces of the pair of radial projections 69.

The second one-way rotational transfer mechanism MM2 and the ultrasonic motor UM constitute an ultrasonic rotary drive device MU.

The input gear 16, the stationary housing 20, the AF joint 41 (the gear 42), the first one-way rotational transfer mechanism MM1, the ultrasonic rotary drive device MU and the power transmission shaft 48 (the gears 49A and 49B) are elements of the lens drive mechanism DM.

A focusing operation of the camera system 10 that has the above described structure will be discussed hereinafter.

Since operations of the camera system 10 differ according to whether the interchangeable lens 11 is mounted to the old-type camera body 12A or the new-type camera body 12B, in the following description the focusing operation of the camera system 10 will be discussed in two cases: the case where the interchangeable lens 11 is mounted to the old-type camera body 12A, and the case where the interchangeable lens 11 is mounted to the new-type camera body 12B.

[Interchangeable Lens 11 Mounted to Old-Type Camera Body 12A]

Upon the interchangeable lens 11 being mounted to the old-type camera body 12A, the AF joint 41 of the interchangeable lens 11 is mechanically connected to the body-motor 17 of the old-type camera body 12A. However, the ultrasonic motor UM of the interchangeable lens 11 cannot be supplied with power from the power supply 18A because the conductive pins P1 of the interchangeable lens 11 do not establish connection with any member on the camera body 12A.

In this case, an autofocusing operation of the camera system 10 is performed as follows.

Upon the AF switch 19 provided on the old-type camera body 12A being operated, the power supply 18A supplies electric power to the controller C2, and thereupon, the controller C2 sends the body-motor 17 a drive signal (rotation signal) for rotating the body-motor 17.

If this drive signal is a forward-rotation drive signal for rotating the body-motor 17 in the forward direction, the body-motor 17 rotates forward, and this forward rotation of the body-motor 17 is transferred to the input gear 37 of the first one-way rotational transfer mechanism MM1 via the AF joint 41 (and the gear 42). Thereupon, the input gear 37 and the rotary input portion 29 rotate about the stationary shaft 26 counterclockwise as viewed from the front of the lens drive mechanism DM. This counterclockwise rotation of the rotary input portion 29 causes each differential roller 53, which is held between the axially-orthogonal surface 35 of the rotary input portion 29 and the axially-orthogonal surface 51 of the annular pressing member 50, to rotate on the axis A2 while revolving around the axis A1 in the same rotational direction as the rotary input portion 29 at a revolving speed half the rotational speed of the rotary input portion 29. Due to this revolving movement of each differential roller 53, the cylindrical retainer 57 and each engageable roller 55 also rotate (revolve) counterclockwise at the same speed as each differential roller 53. Thereupon, each engageable roller 55 firmly wedges into one of the radially-narrowed circumferentially opposite end portions of the associated accommodation space CS which is positioned on the clockwise side in the accommodation space CS between the end of the associated circumferentially-uneven-width groove 36 in the clockwise direction and the cylindrical surface 52 of the large-diameter portion 44 of the cylindrical rotary output shaft 43. This causes the rotary input portion 29 and the cylindrical rotary output shaft 43 to become integral with each other circumferentially via the differential rollers 53, the cylindrical retainer 57 and the wedged engageable rollers 55 so that the rotation of the rotary input portion 29 is transferred to the cylindrical rotary output shaft 43 to rotate the cylindrical rotary output shaft 43 counterclockwise with respect to FIG. 7. Thereupon, this rotation of the cylindrical rotary output shaft 43 is transferred from the output gear 46 to the gear 49B, thus causing the power transmission shaft 48 to rotate clockwise with respect to FIG. 7. This clockwise rotational force of the power transmission shaft 48 is transferred from the gear 49A to the input gear 16 of the distance adjustment ring 15, thus causing the distance adjustment ring 15 to rotate counterclockwise as viewed from the front of the lens drive mechanism DM (the distance adjustment ring 15 and the gear 49A rotate in opposite directions relative to each other). Consequently, the focusing lens group L moves forward along the optical axis O to bring an object into focus automatically.

On the other hand, if the controller C2 outputs a reverse-rotation drive signal (rotation signal) to the ultrasonic motor UM to rotate the ultrasonic motor UM in the reverse direction upon the AF switch 19 being operated, the input gear 37 of the first one-way rotational transfer mechanism MM1, to which the rotational force has been transferred from the gear 42 of the AF joint 41, and the rotary input portion 29 rotate clockwise as viewed from the front of the lens drive mechanism DM. This clockwise rotation causes each differential roller 53 to rotate on the axis A2 while revolving around the axis A1 in the clockwise direction as viewed from the front of the lens drive mechanism DM at a revolving speed half the rotational speed of the rotary input portion 29. Due to this clockwise revolving movement of each differential roller 53, the cylindrical retainer 57 and each engageable roller 55 also rotate (revolve) clockwise at the same speed as each differential roller 53. As a result, each engageable roller 55 firmly wedges into the other of the radially-narrowed circumferentially opposite end portions of the associated accommodation space CS which is positioned on the counterclockwise side in the accommodation space CS between the end of the associated circumferentially-uneven-width groove 36 in the counterclockwise direction and the cylindrical surface 52 of the large-diameter portion 44 of the cylindrical rotary output shaft 43. This causes the rotary input portion 29 and the cylindrical rotary output shaft 43 to become integral with each other circumferentially via the differential rollers 53, the cylindrical retainer 57 and the wedged engageable rollers 55 so that the rotation of the rotary input portion 29 is transferred to the cylindrical rotary output shaft 43 to rotate the cylindrical rotary output shaft 43 clockwise as viewed from the front of the lens drive mechanism DM. Thereupon, this rotation of the cylindrical rotary output shaft 43 is transferred from the output gear 46 to the input gear 16 via the gear 49B, the power transmission shaft 48 and the gear 49A to rotate the distance adjustment ring 15 clockwise as viewed from the front of the lens drive mechanism DM. Consequently, the focusing lens group L moves rearward along the optical axis to bring an object into focus automatically.

Since the power transmission shaft 48 rotates in either case where the body-motor 17 rotates forward or where the body-motor 17 rotates reverse in this manner, the rotational force of the power transmission shaft 48 is transferred to the output gear 46 of the second one-way rotational transfer mechanism MM2 via the gear 49B. Accordingly, this rotational force is not transferred to any of the engageable rollers 55 from the cylindrical surface 52 though the output gear 46 and the cylindrical rotary output shaft 43 of the second one-way rotational transfer mechanism MM2 rotate since the inner peripheral surface of the large-diameter portion 44 of the hollow-cylindrical rotary output shaft 43 is formed as the cylindrical surface 52 centered about the axis A4. Therefore, this rotational force is not transferred to either the rotary input portion 68 or the rotary input shaft 67 of the second one-way rotational transfer mechanism MM2, thus not causing the cylindrical rotary output shaft 75 of the ultrasonic motor UM to rotate relative to the ultrasonic generating member 71, which prevents surfaces of the outer cylindrical portion 73 and the vibration transmission portion 72 which are in contact with each other from wearing away even if an autofocusing operation is performed by an operation of the body-motor 17.

Additionally, whether the body-motor 17 rotates forward or reverse, the controller C2 sends the body-motor 17 a signal causing the body-motor 17 to rotate in a rotational direction opposite to the previous rotational direction (rotational direction immediately before focusing is obtained) thereof by an angle of rotation smaller than that of the backlash between the gear 42 and the input gear 37 upon an autofocusing operation being performed with the power of the body-motor 17. Thereupon, the rotary input portion 29 rotates in a rotational direction opposite to the previous rotational direction, in which the rotary input portion 29 rotates immediately before the aforementioned in-focus state is obtained, without rotating the cylindrical rotary output shaft 43 to thereby reduce the contact force of each engageable roller 55 with the associated circumferentially-uneven-width groove 36 and the large-diameter cylindrical surface 52 of the cylindrical rotary output shaft 43. This reduction of such a contact force allows the manual focus ring 14 of the interchangeable lens 11 to be rotated smoothly.

Operations of the camera system 10 when a manual focusing operation is carried out in the case where the interchangeable lens 11 is mounted to the old-type camera body 12A will be discussed hereinafter.

If the manual focus ring 14 of the interchangeable lens 11 shown in FIG. 1 is rotated clockwise or counterclockwise as viewed from the front thereof, this rotational force of the manual focus ring 14 is transferred to the distance adjustment ring 15 to move the focusing lens group L forward or rearward along the optical axis O to perform a manual focusing operation.

Since the rotational force of the distance adjustment ring 15 is transferred to the gear 49A via the input gear 16 during the operation of the manual focus ring 14, the power transmission shaft 48 rotates clockwise or counterclockwise, and this rotational force of the power transmission shaft 48 is transferred to both the output gear 46 (the hollow-cylindrical rotary output shaft 43) of the first one-way rotational transfer mechanism MM1 and the output gear 46 (the hollow-cylindrical rotary output shaft 43) of the second one-way rotational transfer mechanism MM2.

However, as mentioned above, even if the hollow-cylindrical rotary output shaft 43 of the second one-way rotational transfer mechanism MM2 rotates, this rotational force of the hollow-cylindrical rotary output shaft 43 is not transferred to the rotary input shaft 67, and accordingly, the cylindrical rotary output shaft 75 of the ultrasonic motor UM not in action rotates relative to the ultrasonic generating member 71, which prevents surfaces of the outer cylindrical portion 73 and the vibration transmission portion 72 which are in contact with each other from wearing away.

Furthermore, even if the hollow-cylindrical rotary output shaft 43 of the first one-way rotational transfer mechanism MM1 rotates, this rotational force of the hollow-cylindrical rotary output shaft 43 is not transferred to the rotary input portion 29 (the input gear 37) of the first one-way rotational transfer mechanism MM1 since the basic structure (capability) of the first one-way rotational transfer mechanism MM is the same as that of the second one-way rotational transfer mechanism MM2. Therefore, the rotational force of the power transmission shaft 48 (the gear 49B) is not transferred to the body-motor 17 via the first one-way rotational transfer mechanism MM1 and the AF joint 41 (the gear 42), so that no load is exerted on the body-motor 17 not in action.

[Interchangeable Lens 11 Mounted to New-Type Camera Body 12B]

Upon the interchangeable lens 11 being mounted to the new-type camera body 12B, the conductive pins P1 of the interchangeable lens 11 and the conductive pins P2 of the new-type camera body 12B come in contact with one another, so that the power supply 18B of the new-type camera body 12B can supply electric power to the ultrasonic motor UM.

In this case, an autofocusing operation of the camera system 10 is performed as follows.

Upon the AF switch 19 provided on the new-type camera body 12B being operated, the power supply 18B of the new-type camera body 12B supplies electric power to the controller C1 of the interchangeable lens 11 via the conductive pins P2 and P1, and thereupon, the controller C1 sends the ultrasonic motor UM a drive signal (rotation signal) for rotating the ultrasonic motor UM.

If this drive signal is a forward-rotation drive signal for rotating the ultrasonic motor UM in the forward direction, the ultrasonic generating member 71 generates ultrasonic vibrations traveling in one circumferential direction (counterclockwise direction as viewed from the front of the lens drive mechanism DM). Thereupon, the cylindrical rotary output shaft 75 (the outer cylindrical portion 73) that is in contact with the rear end surface of the vibration transmission portion 72 rotates in the same direction as the ultrasonic vibrations generated by the ultrasonic generating member 71, and accordingly, the rotary input shaft 67 and the rotary input portion 68, which are integral with the cylindrical rotary output shaft 75, rotate counterclockwise as viewed from the front of the lens drive mechanism DM). Thereupon, similar to the movement of the first one-way rotational transfer mechanism MM1 as mentioned above, this counterclockwise rotation of the rotary input shaft 67 and the rotary input portion 68 is transferred to the cylindrical rotary output shaft 43 via each differential roller 53, the cylindrical retainer 57 and each engageable roller 55, thus causing the cylindrical rotary output shaft 43 to rotate counterclockwise as viewed from the front of the lens drive mechanism DM, and therefore, the distance adjustment ring 15 rotates counterclockwise as viewed from the front of the lens drive mechanism DM. Consequently, the focusing lens group L moves forward along the optical axis O to bring an object into focus automatically.

On the other hand, if the controller C1 sends the ultrasonic motor UM a reverse-rotation drive signal causing the ultrasonic motor UM to rotate in the reverse direction upon the AF switch 19 provided on the new-type camera body 12B being operated, the ultrasonic generating member 71 generates ultrasonic vibrations traveling in the other circumferential direction (clockwise direction as viewed from the front of the lens drive mechanism DM). Thereupon, the outer cylindrical portion 73 of the cylindrical rotary output shaft 75 that is in contact with the rear end surface of the vibration transmission portion 72 rotates in the same direction as the ultrasonic vibrations generated by the ultrasonic generating member 71. Thereupon, this clockwise rotation of the outer cylindrical portion 73 is transferred from the rotary input portion 68 to the hollow-cylindrical rotary output shaft 43, thus causing the cylindrical rotary output shaft 43 to rotate clockwise as viewed from the front of the lens drive mechanism DM. Furthermore, this rotational force is transferred to the input gear 16 via the gear 49B, the power transmission shaft 48, and the gear 49A to rotate the distance adjustment ring 15 clockwise as viewed from the front of the lens drive mechanism DM. Consequently, the focusing lens group L moves rearward along the optical axis O to bring an object into focus automatically.

In this case also, immediately after an in-focus state is obtained by the power of the ultrasonic motor UM, the controller C1 sends a control signal to the ultrasonic motor UM to rotate the ultrasonic motor UM slightly in a rotational direction opposite to the previous rotational direction (rotational direction immediately before focusing is obtained) of the ultrasonic motor UM, and accordingly, the manual focus ring 14 can be smoothly rotated thereafter.

In the case where a manual focusing operation is performed by operating the manual focus ring 14 of the interchangeable lens 11, the first one-way rotational transfer mechanism MM1 and the second one-way rotational transfer mechanism MM2 prevent this rotational force of the distance adjustment ring 15 from being transferred to the body-motor 17 and the ultrasonic motor UM. Therefore, the cylindrical rotary output shaft 75 of the ultrasonic motor UM not in action rotates relative to the ultrasonic generating member 71, which prevents surfaces of the outer cylindrical portion 73 and the vibration transmission portion 72 which are in contact with each other from wearing away; moreover, no load is exerted on the body-motor 17 not in action.

As described above, according to the above described embodiment of the interchangeable lens incorporating a lens drive motor, in the case where the interchangeable lens 11 is mounted to the new-type camera body 12B that is capable of supplying power to the ultrasonic motor UM provided in the interchangeable lens 11, the focusing lens group L can be driven by the ultrasonic motor UM adopted according to specifications of the photographic lens system provided in the interchangeable lens 11. In addition, in the case where the interchangeable lens 11 is mounted to the old-type camera body 12A that is incapable of supplying power to the ultrasonic motor UM provided in the interchangeable lens 11 but capable of supplying power to the body-motor 17, power is supplied to the body-motor 17 from the power source 18A to drive the focusing lens group L. Accordingly, the present embodiment of the interchangeable lens 11 can drive the focusing lens group L regardless of whether the interchangeable lens 11 is mounted to the new-type camera body 12B or the old-type camera body 12A.

Additionally, no needless load is loaded to either the body-motor 17 not in action or the ultrasonic motor UM not in action since no motive power is transferred to the output part of either the body-motor 17 or the ultrasonic motor UM which is not in action due to the above described configuration in which the interchangeable lens 11 incorporates the first one-way rotational transfer mechanism MM1 and the second one-way rotational transfer mechanism MM2.

If both the first one-way rotational transfer mechanism MM1 and the second one-way rotational transfer mechanism MM2 are incorporated in an interchangeable lens like the above described embodiment of the interchangeable lens, the interchangeable lens does not have to be provided with any switch for selecting between the two motors to be used at an autofocusing operation and for interrupting the transfer of power between the motor not in use and the distance adjustment ring 15. Moreover, a photographing state can be switched between autofocus (AF) mode and manual focus (MF) mode with no need to provide the interchangeable lens with a switch for switching between autofocus mode and manual focus mode.

A torque can be reliably transferred from the rotary input portion (29 or 68) to the cylindrical rotary output shaft 43 because each differential roller 53 is made to revolve around the rotary input portion (29 or 68) in the same direction as the rotation of the rotary input portion (29 or 68) while trailing behind the rotation of the rotary input portion (29 or 68) (i.e., while revolving at a slower speed than the rotation of the rotary input portion (29 or 68) in association with the rotation of the rotary input portion (29 or 68)), and subsequently because each engageable roller 55 is made to wedge firmly between the rotary input portion (29 or 68) and the cylindrical rotary output shaft 43 by the differential rollers 53 to serve as a torque transfer member.

Moreover, since each engageable roller 55 that serves as a torque transfer member is formed in a cylindrical shape, the axis A3 of which is parallel to the axis of the rotary input portion (29 or 68), each engageable roller 55 is in contact with each of the rotary input portion (29 or 68) and the cylindrical rotary output shaft 43 (the cylindrical surface 52) on a contact area greater than that in the case where the torque transfer member is formed as a spherical member. Therefore, the efficiency of transferring torque from the rotary input portion (29 or 68) to the cylindrical rotary output shaft 43 in the present embodiment of the lens drive mechanism DM that incorporates both the first one-way rotational transfer mechanism MM1 and the second one-way rotational transfer mechanism MM2 is higher than that in the case where each torque transfer member is formed as a spherical member.

Moreover, since each of the first one-way rotational transfer mechanism MM1 and the second one-way rotational transfer mechanism MM2 uses the cylindrical retainer 57, the annular space RS, which is formed between the rotary input portion (29 or 68) and the cylindrical rotary output shaft 43, can be used in a space-effective manner. This makes it possible to increase the number of the engageable rollers 55. Increasing the number of the engageable rollers 55 makes it possible to improve the efficiency of transferring torque from the rotary input portion (29 or 68) to the cylindrical rotary output shaft 43. Furthermore, the utilization of the cylindrical retainer 57 makes it easy to assemble the lens drive mechanism DM and makes it possible to reduce the number of the engageable rollers 55.

The present invention is not limited solely to the above-described particular embodiment. Various modifications of the above-described embodiment are possible.

For example, although the ultrasonic motor UM is adopted as the lens-motor provided in the interchangeable lens 11, the ultrasonic motor UM can be replaced by a commonly-used motor using coils similar to the body-motor 17, or another type of actuator.

The number of the differential rollers 53 or the engageable rollers 55 which are accommodated in each accommodation space CS can be changed by changing a cross sectional shape of the portion of the rotary input portion (29 or 68) on which the four circumferentially-uneven-width grooves 36 are formed to a regular polygonal shape other than a square shape such as a regular triangular shape or a regular pentagonal shape, or by forming the same portion of the rotary input portion (29 or 68) to have a non-circular cross section so as to include at least one surface (circumferentially-uneven-width-space forming portion) which forms an accommodation space between an inner peripheral surface (cylindrical surface) of the cylindrical rotary output shaft 43 (the large-diameter cylindrical surface 44) and the aforementioned portion of the rotary input portion (29 or 68) so that the accommodation space has different radial widths at different circumferential positions. The efficiency of transferring torque from the rotary input portion (29 or 68) to the cylindrical rotary output shaft 43 can be adjusted via a change in the number of the differential rollers 53 or the engageable rollers 55.

Each differential roller 53 can be replaced by a simple spherical member and also each engageable roller 55 can also be replaced by a simple spherical member if the efficiency of transferring torque from the rotary input portion (29 or 68) to the cylindrical rotary output shaft 43 does not have to be taken into account.

Figure 8:
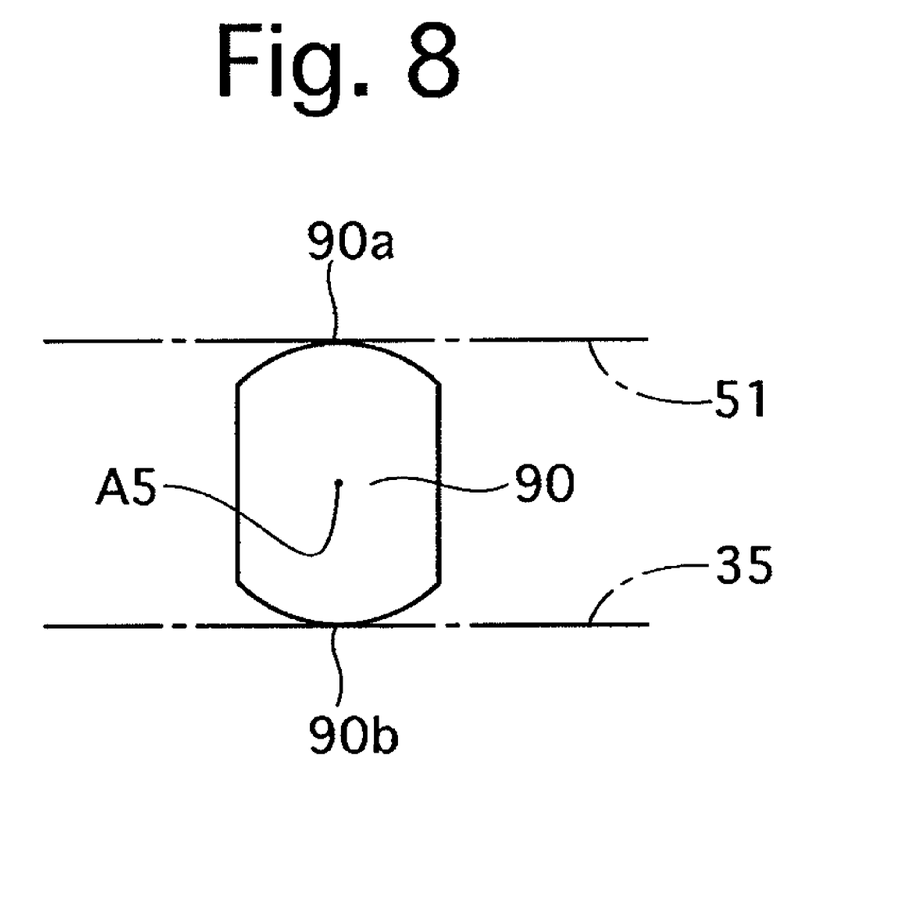
FIG. 8 is a cross sectional view of another embodiment of a differential roller, taken along a plane orthogonal to the axis thereof.

Each differential roller 53 can be replaced by a differential roller 90 such as shown in FIG. 8. The differential roller 90 is formed so that an axis A5 thereof extends in a radial direction of the rotary input portion (29 or 68), and so that the cross sectional shape of the differential roller 90 taken along a plane orthogonal to the axis A5 is the same as that shown in FIG. 8 at any axial position on the axis A5. In this case, the rotary input portion (29 or 68) is rotated in a range so that a pair of arc portions 90a and 90b of the differential roller 90 remain engaged with the axially orthogonal surfaces 35 and 51, respectively, to make each engageable roller 55 wedge firmly between the rotary input portion (29 or 68) and the cylindrical rotary output shaft 43.

In addition, each engageable roller 55 can be installed only in a single accommodation space CS if the efficiency of transferring torque from the rotary input portion (29 or 68) to the cylindrical rotary output shaft 43 does not have to be taken into account.

The efficiency of transferring torque transferred from the rotary input portion (29 or 68) to the cylindrical rotary output shaft 43 can be changed by changing the wedge angle between the cylindrical surface 52 of the large-diameter portion 44 of the cylindrical rotary output shaft 43 and one end of the circumferentially-uneven-width groove 36, or by changing the following factors: the spring force of the compression coil spring S1, the surface friction of the axially orthogonal surface 35 and the surface friction of the axially orthogonal surface 51.

In addition, although the lens drive mechanism DM is applied to an interchangeable lens designed for autofocus in the above illustrated embodiment of the interchangeable lens, the lens drive mechanism DM can be installed between a zoom ring (hand-operated ring) which is provided on an interchangeable zoom lens and a zooming mechanism which is provided in the interchangeable lens to be linked with the zoom ring so that rotation of each of the ultrasonic motor UM (used as a zoom motor) and the body-motor 17 (used as a zoom motor) is transferred to the zooming mechanism and so that rotation of the zoom ring is not transferred to either of the ultrasonic motor UM or the body-motor 17. This makes a power zoom operation (motor-driven zooming operation) and a manual zoom operation possible without the need for any switch for switching between power zoom mode and manual zoom mode.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An interchangeable lens that detachably attaches to a camera body having a body-motor, said interchangeable lens comprising:
    a single lens drive mechanism that drives a single movable lens group in an optical axis direction;
    a lens-motor that drives said single movable lens group via said single lens drive mechanism; and
    a power transmission mechanism that transmits a driving force of said body-motor of the camera body to said single lens drive mechanism of said interchangeable lens,
    wherein said interchangeable lens is selectively mountable to first and second types of camera bodies, said first type of camera body including a power source capable of supplying electric power to said body-motor and incapable of supplying electric power to said lens-motor, and said second type of camera body including a power source for said lens-motor, and
    said interchangeable lens further comprises an electric power transfer member that receives a supply of electric power from said power source of said second type of camera body when said interchangeable lens is mounted to said second type of camera body.

2. The interchangeable lens according to claim 1, wherein said power transmission mechanism serves as a first one-way rotational transfer mechanism which transmits said driving force of said body-motor to said single lens drive mechanism and prevents movements of said single lens drive mechanism from being transmitted to said body-motor, and
    said interchangeable lens further comprises a second one-way rotational transfer mechanism which is positioned between said lens-motor and said single lens drive mechanism, said second one-way rotational transfer mechanism transmitting a driving force of said lens-motor to said single lens drive mechanism and preventing movements of said lens drive mechanism from being transmitted to said lens-motor.

3. The interchangeable lens according to claim 1, wherein said lens-motor comprises an ultrasonic motor.

4. The interchangeable lens according to claim 1, wherein said power transmission mechanism comprises a rotatable coupler which is provided at a rear end of said interchangeable lens, said rotatable coupler being coupled to a rotary shaft of said body-motor upon said interchangeable lens being mounted to said camera body.

5. The interchangeable lens according to claim 1, wherein said electric power transfer member comprises at least one conductive pin.

6. The interchangeable lens according to claim 1, wherein said single movable lens group is a focusing lens group.

7. An interchangeable lens comprising:
    a movable lens group;
    a lens drive mechanism;
    a lens-motor that drives said movable lens group via said lens drive mechanism;
    a first one-way rotational transfer mechanism, provided between said lens drive mechanism and a rotatable coupler positioned at a rear end of said interchangeable lens, that transmits a driving force of a body-motor provided in a first type of camera body to said lens drive mechanism and prevent movements of said lens drive mechanism from being transmitted to said body-motor when said interchangeable lens is mounted to the first type of camera body, and
    a second one-way rotational transfer mechanism, provided between said lens drive mechanism and said lens-motor, that transmits a driving force of said lens-motor to said lens drive mechanism and prevents movements of said lens drive mechanism from being transmitted to said lens-motor when said interchangeable lens is mounted to a second type of camera body which includes a power source for said lens-motor;
    wherein said rotatable coupler is coupled to a rotary shaft of said body-motor upon said interchangeable lens being mounted to said first type of camera body,
    said first type of camera body includes a power source which supplies electric power to said body-motor,
    said first type of camera body does not include a power source for said lens-motor, and
    said lens drive mechanism is provided between said first one-way rotational transfer mechanism and said second one-way rotational transfer mechanism.

8. An interchangeable lens, comprising:
    a rotatable coupler that couples to a body motor in a camera body;
    a lens motor;
    a first power transmission mechanism which is connected to the rotatable coupler;
    a second power transmission mechanism which is connected to the lens motor; and
    a lens drive mechanism which drives a movable lens group and is provided between the first power transmission mechanism and the second power transmission mechanism, the first power transmission mechanism transmitting a driving force of the body motor to the lens drive mechanism, and the second power transmission mechanism transmitting a driving force of the lens motor to the lens drive mechanism.

9. The interchangeable lens according to claim 8, wherein the first and second power transmission mechanisms are provided in a single housing, and the lens drive mechanism is disposed at a position intermediate of positions of the first and second power transmission mechanisms.

10. The interchangeable lens according to claim 8, wherein the entire lens motor and the entire rotatable coupler are positioned at opposite sides of a shaft axis of the lens drive mechanism.

* * * * *